United States Patent [19]

Newman

[11] Patent Number: 5,069,347

[45] Date of Patent: Dec. 3, 1991

[54] LOCKING COIN DISPLAY HOLDER

[76] Inventor: Anthony E. Newman, 2340 Horizon Cir., Shakopee, Minn. 55379

[21] Appl. No.: 536,327

[22] Filed: Jun. 11, 1990

[51] Int. Cl.⁵ .............................................. A47F 7/00
[52] U.S. Cl. .......................................... 211/4; 211/41
[58] Field of Search ................... 211/4, 40, 41, 169.1; 70/58, 63; 312/13, 14; 206/387, 309, 425

[56] References Cited

U.S. PATENT DOCUMENTS

| | | | |
|---|---|---|---|
| 3,712,477 | 1/1973 | Kieves | 211/40 |
| 4,629,067 | 12/1986 | Pavlik et al. | 211/41 X |
| 4,684,019 | 8/1987 | Egly | 312/13 X |
| 4,781,292 | 11/1988 | Sacherman et al. | 211/40 X |
| 4,850,477 | 7/1989 | Gelardi et al. | 206/425 X |
| 4,865,190 | 9/1989 | Gregerson et al. | 206/387 X |
| 4,976,373 | 12/1990 | Perdue et al. | 206/425 X |

FOREIGN PATENT DOCUMENTS 1373004  11/1974  United Kingdom .................. 211/4

Primary Examiner—Robert W. Gibson, Jr.
Attorney, Agent, or Firm—D. L. Tschida

[57] ABSTRACT

A multi-sided tray including means for pivotally supporting a plurality of coin display holders. Winged projections from each holder align with slots which include an entry/exit portion and a pivot portion. Transverse longitudinal slots receive notched slide rails which align with the holder slots and whereby individual holders may be released or locked to the tray relative to a keyed lock engages a slide actuation means.

18 Claims, 5 Drawing Sheets

LOCKING COIN DISPLAY HOLDER

BACKGROUND OF THE INVENTION

The present invention relates to coin display holders and, in particular, to a locking support tray wherein individual coin containing holders or so called slabs (i.e. sealed transparent plastic holders) are pivotally secured.

Numistists, including collectors and dealers, commonly attend shows whereat coins of various grades are bought and sold. Depending upon the value of the coins, the coins may be supported in a variety of fashions, from lying loose and being strewn about a display table for inspection by purchasers to being organized by grade, cost, or other criteria on cloth-lined trays to being secured within glass front cases which may or may not be locked. Most typically, however, the slabs regardless of value are strewn about the display table. Although such an offering may facilitate handling by would-be customers, the dealer must diligently guard against theft.

Appreciating that most coins of collectable value are currently graded and sealed within slabs of reasonably standardized dimensions by a number of certified grading agencies, it has become more convenient to provide a holder which accommodates a number of such slabs.

Appreciating further that a dealer can never totally ignore the potential of theft, yet must make his/her offerings readily available to customers, Applicant has developed a display tray which facilitates access to the coins by purchasers, yet in a manner whereby the coins are individually secured and organized within a number of paged, display holders. The tray may additionally be secured to the display table.

Other than the foregoing conventional slab coin holders, Applicant is also aware of a number of coin holders which are shown in U.S. Pat. Nos. 3,448,850; 3,500,995; 3,751,128; 3,776,643; and 4,165,573. The holders of these patents, particularly support individual coins (not pre-packaged slabs) within transparent holders or cases akin to the foregoing slabs.

Applicant is also aware of a variety of storage rack or container constructions which display a plurality of individually pre-packaged items. Such assemblies can be found in U.S. Pat. Nos. 4,520,922; 4,592,465; 4,781,292; and 4,850,477. Of these patents and although not providing for the display of coins, the 4,781,292 and 4,850,477 patents disclose "paged" tray constructions. The 4,781,292 patent discloses individual CD disk holders which interlock within individual, pivotally mounted clip ends that are permanently secured to a tray. Each end includes a pair of stub axles which mate with the tray support. The clip ends are not however secured in removable and/or locked engagement to the support. The 4,850,477 patent discloses a tray including a plurality of vertical stop members which are spaced apart to permit a tilt mounting of disk boxes stored therein.

Applicant is otherwise unaware of a holder which accepts the foregoing graded, coin slabs and supports the slabs in locked and removeable engagement to the tray in a fashion similar to the present invention.

SUMMARY OF THE INVENTION

It is accordingly a primary object of the present invention to provide a support assembly which removably receives in a secure fashion a plurality of display items (e.g. graded coin slabs).

It is a further object of the invention to provide an assembly wherein the displayed items interlock in pivotal engagement with the support assembly.

It is a further object of the invention to provide a support holder of a tray construction including means for simultaneously locking or releasing a number of individual holders into secured engagement with the tray holder.

It is a further object of the invention to provide a tray holder which includes further security means for binding the tray holder to a display surface.

It is a yet further object of the invention to provide a storage container for receiving a plurality of trays for transport.

It is a still further object of the invention to provide various tray covers.

Various of the foregoing objects, advantages and distinctions of the invention will become more apparent upon reference to the following description of variously considered and preferred constructions, along with modifications and improvements thereto.

In one such construction, each slab is secured within a holder which provides for a rigid backing member having flattened wings that project from the lateral sides of a lower end portion. A raised frame secured to the face of the backing member slidably receives and supports an individual slab thereto relative to a resilient slab latch and raised slab biasing tabs which restrain and maintain the slabs in the holder.

An associated tray includes a plurality of vertical channels which include pivot recesses and whereat the individual slab holders are received in pivotal engagement. A pair of transverse longitudinal channelways support a pair of combed slide bars which include notches that align with each vertical tray channel and an adjacent tooth which spans the width of a channel, when the slide bars are moved to a locking position. A transverse spring biased arm and hand grip coupled to each of the slide bars extends and retracts the slide bars relative to a keyed lock and latch arm. The slab holders are thereby simultaneously securable to the tray at a dealer's discretion.

An associated locking cable extends from each tray to a display surface and whereby each tray may be separately tethered. An associated transparent cover may be positioned over each tray. A lockable storage/transport case may separately receive a plurality of trays for transport or grouped display.

Still other objects, advantages and distinctions of the invention, along with the details of the related construction, will become more apparent from the following description with respect to the appended drawings. Before referring thereto, it is to be understood that the following description is made by way only of the presently preferred and variously considered modifications and improvements thereto. It is not intended to be all inclusive and should not be interpreted in strict limitation thereto. Rather the scope of the invention should be interpreted to include all forms which are encompassed by the following claims.

DESCRIPTION OF THE PREFERRED EMBODIMENT

Figure 1:
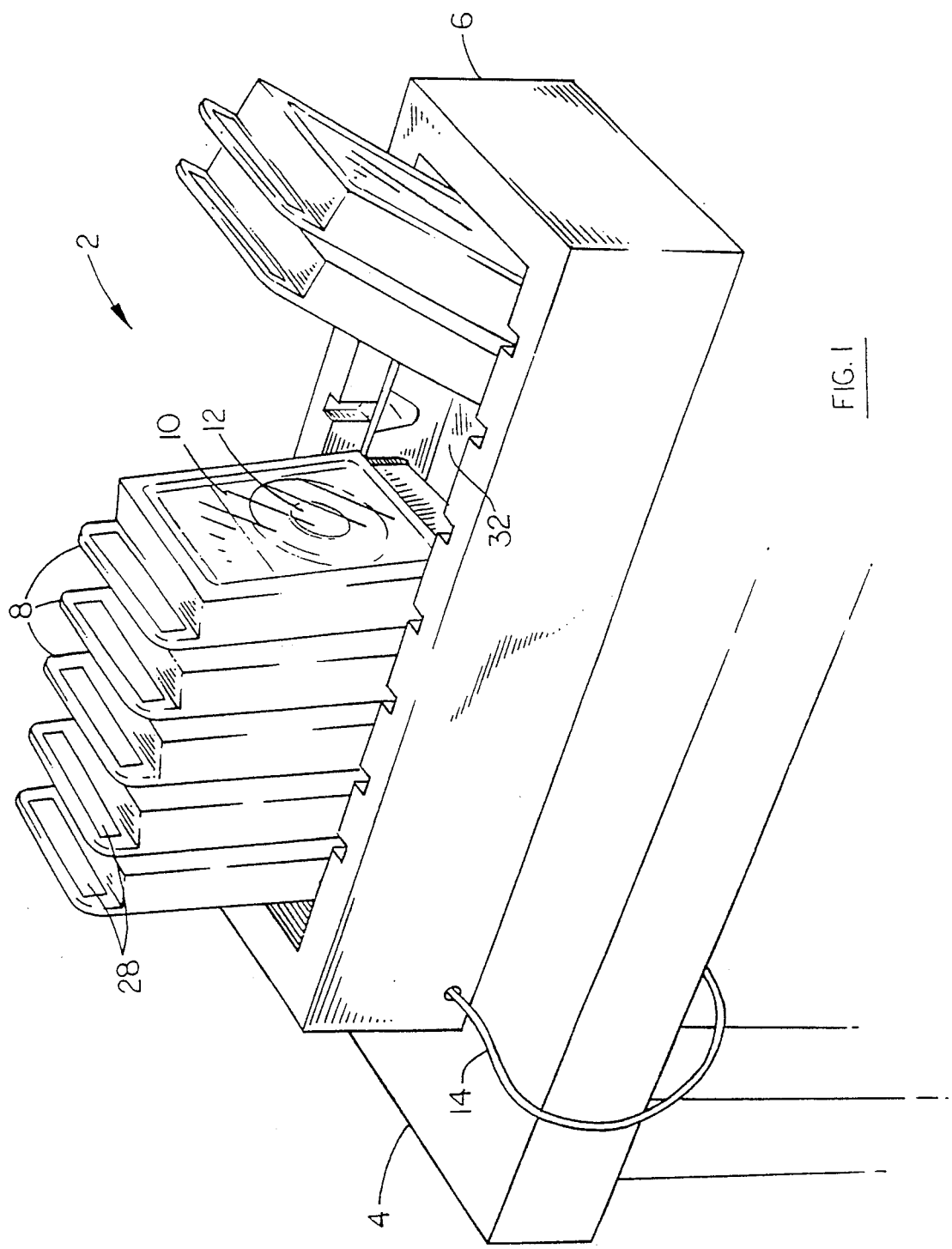
FIG. 1 shows an isometric drawing of the present tray including a plurality of paged coin slabs secured thereto, with the tray tethered to a display table.

Referring to FIG. 1, the coin display tray assembly 2 of the present invention is shown in relation to a typical display table 4, such as is found at a typical numismatist convention or coin show. The assembly 2 comprises a five sided lo-profile base 6 and includes a plurality of slab holders 8, each of which holders 8 individually supports a single slab 10 and contained coin 12 in a flip-chart or paged fashion relative to the base 6.

Each holder 8 is secured to the base 6 by way of a keyed lock assembly (reference FIG. 2) which will be described in greater detail hereinafter. Otherwise, a separate, multi-stranded and covered tether cord 14 couples the base 6 to the display table 4. An exhibitor is thereby assured that the tray assembly 2 is not removed from the table without the exhibitor's desires and that the individual displayed coins 12 are not removed from the tray assembly 2 without the exhibitor's further intention. Removed from the tray 2 is a separate transparent cover 14 (reference FIG. 2) which, optionally, may be included with each individual tray assembly 2.

Figure 4:
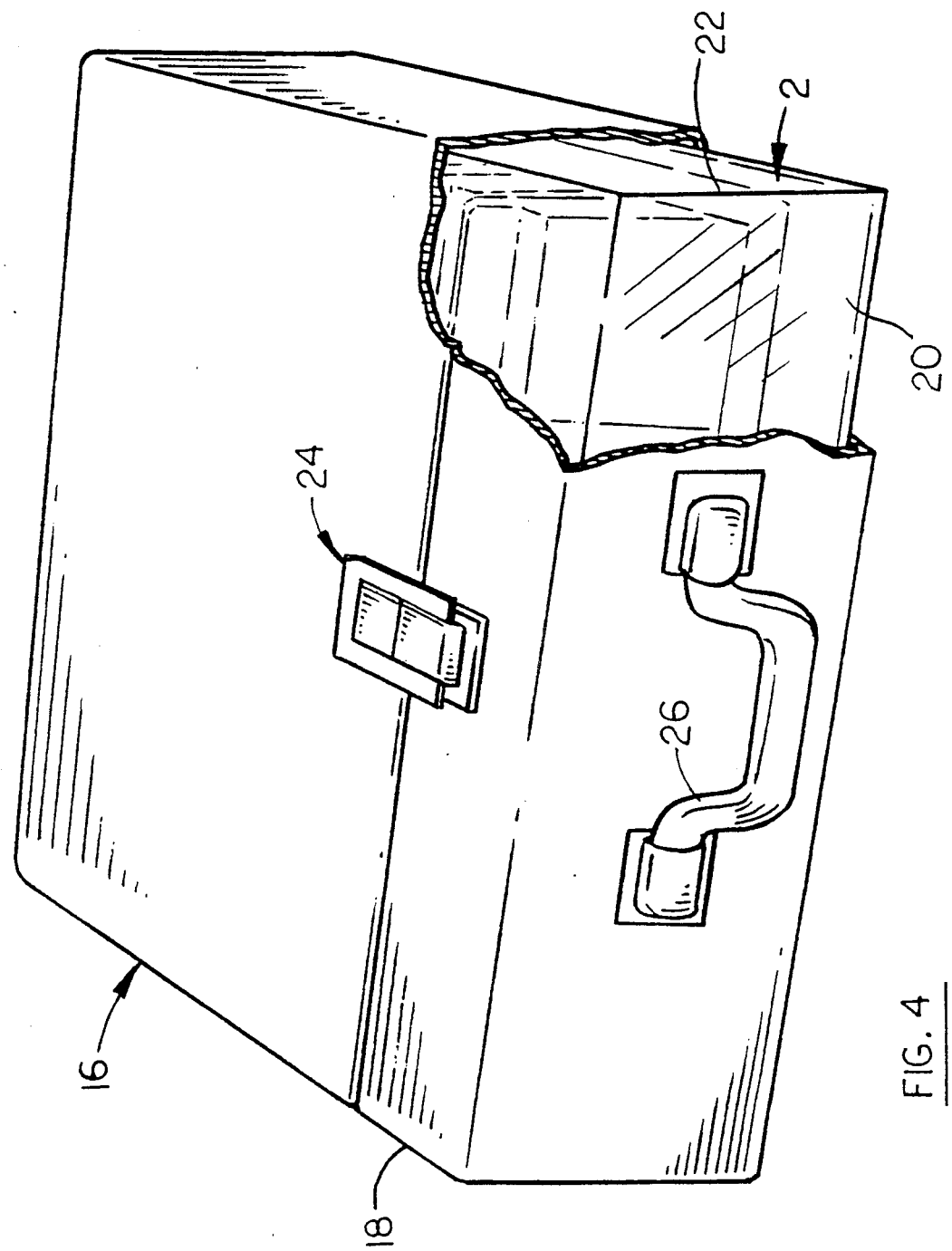
FIG. 4 shows an isometric drawing of a storage/transport case including a plurality of trays mounted therein.

Otherwise and with reference to FIG. 4, the trays 2 during transport to and from an exhibit, are storable within a larger transport or exhibit case 16. As depicted, the case 16 provides for an opaque outer shell portion 18 which surrounds a tray support 20 having a transparent dust cover 22 which mounts thereto. The case end is hinged and a separate locking hasp assembly 24 secures the case, while a handle 26 facilitates transport of a number of trays 2. Normally, the transport case 16 does not appear on the display table, but the dust cover 22 and tray support 20 do permit a showcase type of display mounting, depending on an exhibitor's desires.

When displayed on the table 4, the individual slab holders 8 can be pivoted in a flip-chart fashion to permit ready viewing by a potential purchaser. A label 28 typically appears at the top of each holder 8 to facilitate the paging and identification process. Each holder 8 is also open on its front and rear surfaces, such that an unimpeded inspection of each coin can be achieved by the purchaser without removal from the holder 8. Otherwise, once a desired coin 12 is located by the purchaser, the dealer can release the associated holder 8 from the tray assembly 2 for closer inspection or removal of the coin slab 10 from the holder 8 for purchase. The holders 8 accordingly provide a rigid support for securely restraining each coin slab 10 to the tray assembly 2 in a fashion whereby each coin and its labeled information regarding the slab is readily viewable, along with the coin 12, yet permitting ready removal of each coin 12.

Figure 3:
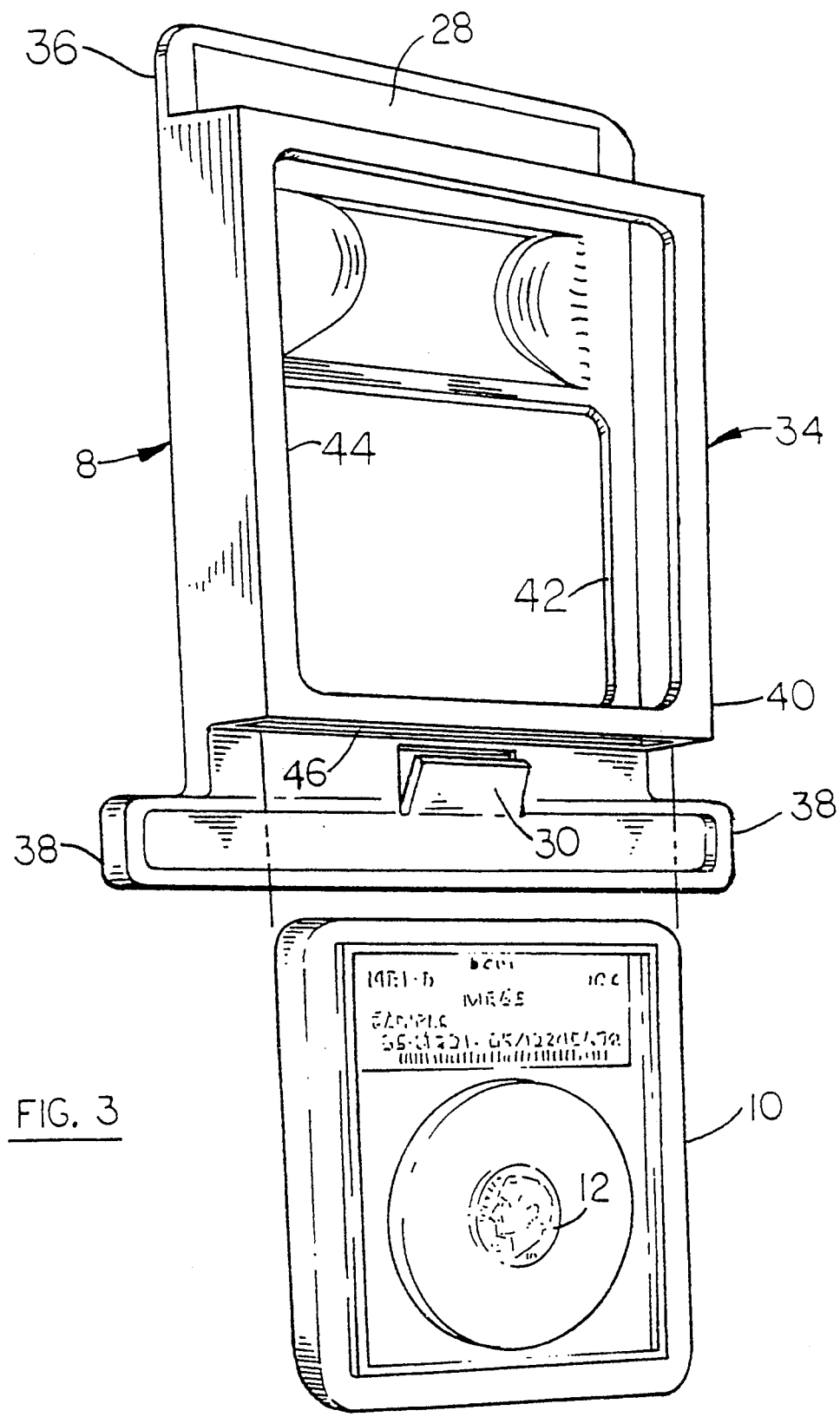
FIG. 3 shows an isometric drawing in exploded assembly of one of the paged holders and the mounting relation of a coin slab thereto.

With further attention to FIG. 3, an isometric view is shown in exploded assembly of one of the holders 8 and an associated slab 10. The slab 10 is particularly removed from the holder 8 by depressing a resilient latch 30, which is formed into the holder 8, and sliding the slab 10 in a downward direction. Such a mounting provides further protection against theft, since if the holder 8 is locked to the base 6, the bottom 32 of the base 6 prevents the slab from being removed from the holder even if released.

As briefly discussed above, a number of grading agencies provide graded coins. Although many use similar slabs 10, some dimensional variations exist between the slabs used by the various agencies. In lieu of providing custom holders 8 with frame portions 34 sized to the specific dimensions of each agency, some dimensional variations can be accommodated in a universal holder 8 having a framing portion 34 sized to the longest slab. The various different slabs 10 can be accommodated therein by appropriately forming the backing plate portion 36 to include the latch 30 and other size accommodating appliances which are discussed in greater detail below.

In this later regard and with attention first directed to FIG. 3, each holder 8 is comprised of a rigid backing plate portion 36 that includes an upper label 28 bearing edge having rounded corners and a lower edge which includes a pair of round cornered pivot ears 38, which laterally project from each side edge. Projecting in spaced relation from the forward face of the holder 8 and backing plate portion 36 is the framing portion 34 which comprises a four-sided frame 40. Front and rear viewing apertures 42, 44 are respectively provided in the backing plate and frame portions 36, 34. An access opening 46 is provided at the bottom of the framing portion.

Figure 5:
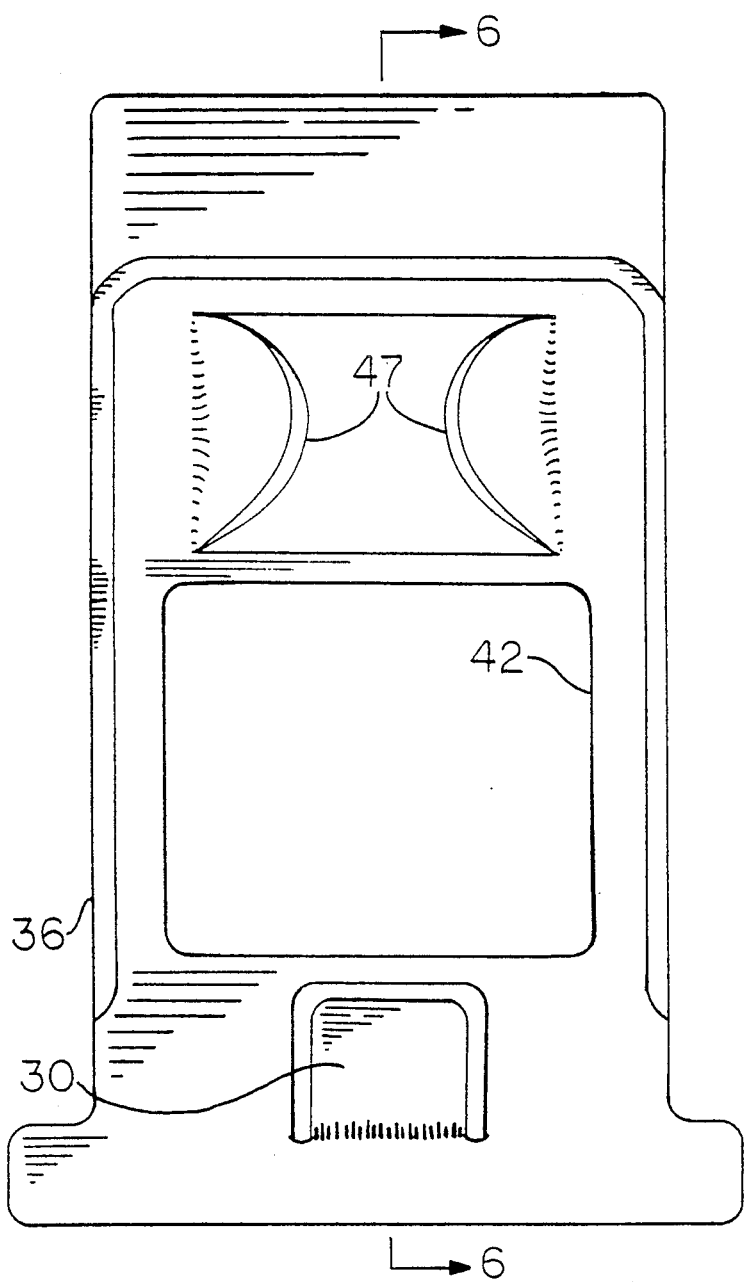
FIG. 5 shows an elevation view of the backing plate of one of the paged slab holders.
Figure 6:
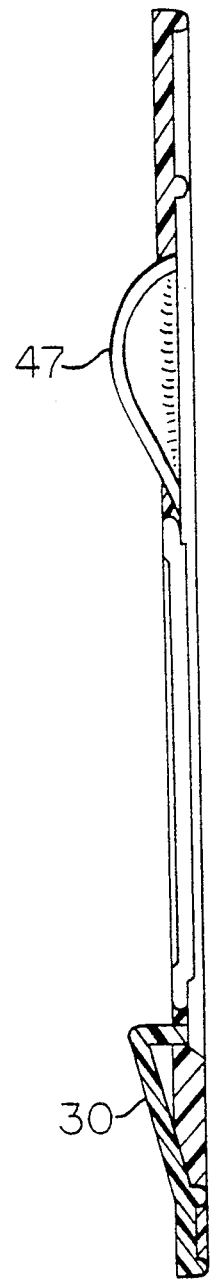
FIG. 6 shows a cross section view taken along reference line 6—6 of FIG. 5.

With further attention to FIGS. 5 and 6, the depth of the present framing portion 34 and lower opening 46 is sized to accommodate the thickest of presently available slabs 10. A pair of resilient spring tabs 47 laterally project from the backing plate 36 in a space 48 above the aperture 44 to bias the slab 10 into engagement with the front face of the frame 34. In normal use the fingers 47 aren't visible and, if a purchaser desires to view the back of a coin, this is readily effected via the aperture 44.

Returning attention to FIG. 3, the spacing of the pivot ears 38 relative to the bottom aperture 46 are otherwise adjusted relative to the base 6 to assure that each coin 12 is fully visible, when secured to the base 6. That is, the holders 8 support the coins 12 substantially above the base. However, a slab 10 cannot be removed from its holder while mounted in the base 6, even if latch 30 is released.

From the foregoing and as distinguished from the earlier mentioned, conventional fashion of randomly displaying coins of significant value on a table top without any security means, the present tray assembly 2 and holders 8 are believed to provide significant advantages.

Figure 2:
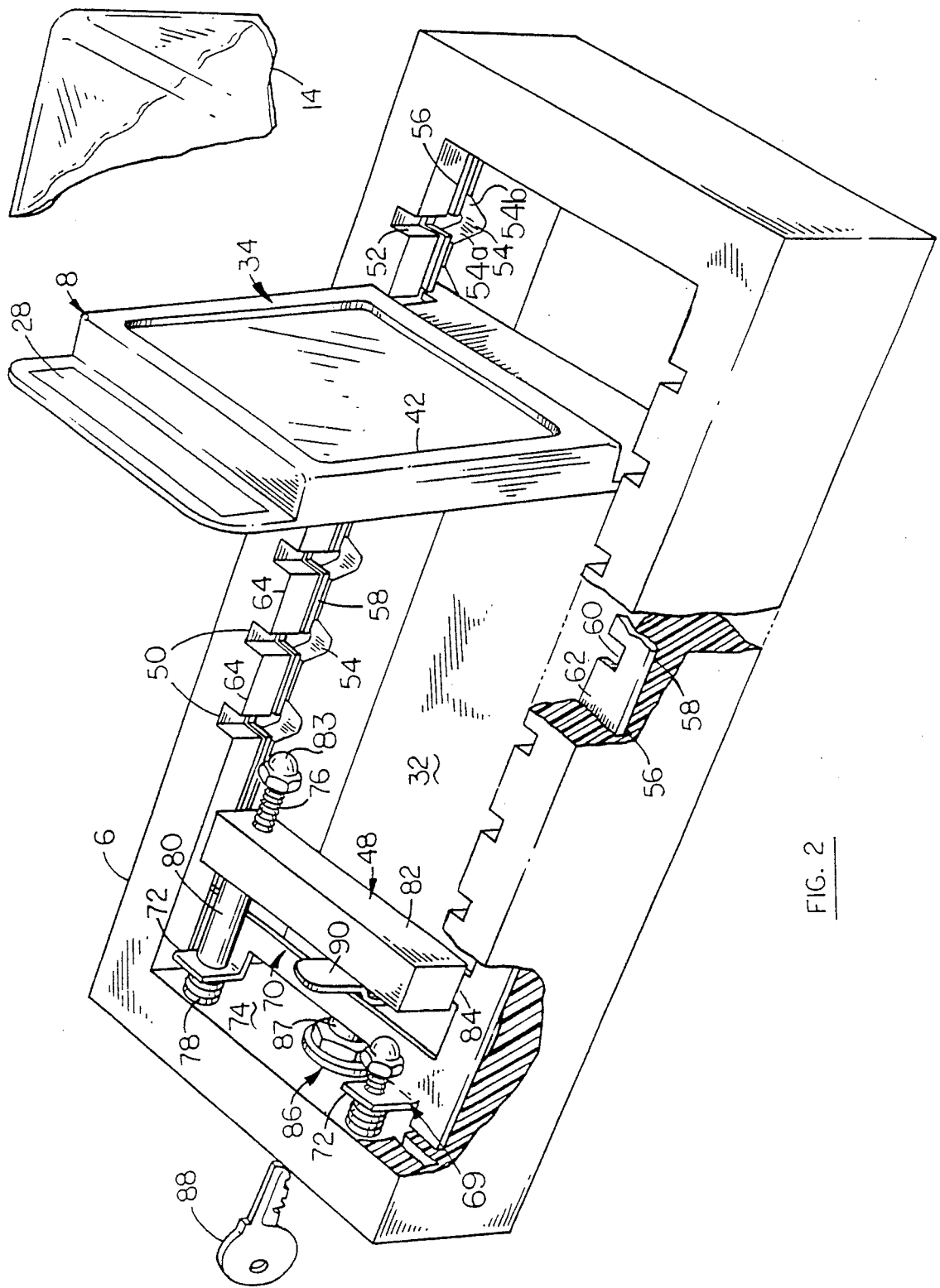
FIG. 2 shows a fore-shortened, detailed isometric drawing in cutaway of the tray and wherefrom the details of the locking bar assembly and alternative slide actuator mechanisms is shown in cutaway.

Turning particular attention next to FIG. 2, a foreshortened and detailed isometric drawing is shown in partial cutaway of a holder 8 in mounted relation to the base 6. The details of the mounting of the holder 8 to the base 6 and an associated keyed locking assembly 48 are particularly apparent from the cutaway portions of this drawing. The locking assembly 48 otherwise also depicts alternative slide actuator arrangements 69.

Directing attention to the fore end of the tray 6 and let into the upper, interior edge surfaces of each of the tray sidewalls are a plurality of vertical notches 50. Each notch 50 includes a primary or slide channelway portion 52 and a bottom or pivot portion 54 of enlarged and triangular or arrow-head like dimension. A longitudinal, transverse channel 56 interconnects with each of the vertical notches 50, just above the enlarged pivot portion 54.

As is to be noted from the drawing, the pivot ears 38 of each holder 8 mount by way of the vertical channelway portion 52 within the enlarged lower portion 54 of each channel 50. Thus, each holder 8 is held by oppositely aligned pairs of notches 50, with the pivot ears 38 pivoting within the lower enlarged region 54. Depending upon the horizontal span of the portion 54 in relation to the pivot ears 38, the amount of rotation of a holder 8 can be varied. Forward and aft stop shoulders 54a and 54b are provided in each pivot region 54 to limit the fore and aft rotation of each holder 8 relative to the base 6.

Slidably mounted within each of the longitudinal channels 56 are a pair of right and left slide bars or rails 58. Each rail 58 is notched in a comb-like fashion to include a plurality of inlets or voids 60 and blanks 62 which dimensionally align with each of the vertical notches 50. When the tray is in an unlocked condition, each of the notches 60 align with each of the channels 50 to permit insertion and removal of the holders 8. Alternatively and during a locked condition, the adjacent blanks 62 span each notch 50 so as to be partially supported by the blanks 64 of the tray sidewalls intermediate each notch 50, and whereby the holders 8 are neither insertable nor removeable from the notches 50. Thus, each holder is maintained in locked relation to the base 6.

Turning attention to the aft or keyed end of the base 6. A view is shown in cutaway of alternative spring biased actuator arrangements relative to the keyed locking assembly 48. The specific differences will become more apparent below. In normal use, this portion of the base is covered with a cover that is not shown.

With reference to the common slide actuator portion 69 of the assembly 48, it is principally comprised of a transverse beam 70, which includes a pair of upright flanges 72, and which extends between the right and left slide rails 58. Rigidly supported and projecting from the aft end wall 74 of the base are right and left axial members 76 which are supported to each flange 72 and whereabout a spring 78 is positioned between each flange 72 and the end wall 74.

Depending upon the specific slide actuator construction and for the upper version, a spacer 80 is positioned between the flange 72 and a forward transverse, hand grip 82 which parallels the beam 70 and which is secured to the fore end of the axial member 76 via a cap nut 83. Presuming the lower flange includes a similar piece part mounting, the slide rails are operable relative to the channels 56 upon squeezing or relaxing the hand grip 82. Such an action induces the voids 60 and blanks 62 of the slide rails 58 into and out of registration with the vertical notches 50.

With attention to the lower flange 72 of the slide actuator 69, an alternative arrangement is shown wherein the spacer 80 is not required. For this arrangement, the axial member 76 extends only between the end wall 74 and slightly beyond the flange 72. The hand grip 82 is secured to a tang 84 which projects from the slide rail 58. Otherwise, the operation is identical to that for the above arrangement.

Projecting interiorly from the aft end wall 74 is a keyed locking assembly 86. This assembly 96 includes a tumbler portion 87 which receives a key 88 and which is exposed to the outer, aft surface of the base 6. A flange member 90 radially extends from the tumbler portion 87 and may be rotated into and out of engagement with the aft transverse beam 70. When the transverse beam 70 is fully retracted and the key 88 rotated to its locked position the flange 90 engages the beam 70 (as shown) to maintain it fully retracted, thereby locking all holders 8 to the base 6. Alternatively, with the transverse beam 70 released, the flange 90 may be rotated to a position behind the transverse member 70 which restrains the slide bars 58 in registration with the channels 50 and permits removal or insertion of the holders 8.

Although the invention has been described with respect to pivot ears or wings 38 which project from the holders 8 and which are generally flat, the wings may alternatively be of a round, ball-like construction and may mate with sockets, which may include fore and aft stops or step surfaces, that project from the sidewalls. Alternatively, the holders 8 may provide sockets which mate with projections that extend from the tray sidewalls. Overlapping slide rails may again be used to secure the holders 8 of either of these later constructions to the tray 6.

While the present invention has been described with respect to various presently considered and preferred embodiments, along with modifications and improvements thereto, it is to be understood that still other modifications may suggest themselves to those of skill in the art. Accordingly, it is contemplated that the scope of the invention should be interpreted to include all those equivalent embodiments encompassed by the following claims.

What is claimed is:

1. Display and storage apparatus comprising:
   (a) a multi-walled tray;
   (b) a plurality of holder means each including a frame portion for removably receiving and restraining a display item thereto and whereby at least one surface of the display item is viewable;
   (c) means for coupling each of said holder means in pivotal, removeable relation to said tray; and
   (d) lockable restraint means for selectively securing each of said holder means to said tray.

2. Apparatus as set forth in claim 1 including a tether cord secured to said tray and means for securing said tether cord to a further support.

3. Apparatus as set forth in claim 1 wherein said tray includes a transparent cover.

4. Apparatus as set forth in claim 1 including:
   (a) a multi-walled container having at least one wall which opens to expose an interior storage compartment;
   (b) means for supporting a plurality of said trays and included holder means within said compartment; and
   (c) means for securing each of said trays to said container.

5. Apparatus as set forth in claim 4 wherein said support means comprises a base wherein said trays are supported and a transparent cover which mates with said base.

6. Apparatus as set forth in claim 1 wherein each of said holder means includes first and second pivot projections and wherein first and second opposite walls of said tray include a plurality of vertical channelways for receiving said pivot projections and supporting each holder means in pivotal relation to said tray.

7. Apparatus as set forth in claim 6 wherein a pivot portion of each channelway includes fore and aft stop shoulders.

8. Apparatus as set forth in claim 7 wherein the pivot portion of said channelway exhibits a triangular shape relative to the plane of said first and second opposite walls.

9. Apparatus as set forth in claim 6 wherein each of said first and second opposite walls includes a longitudinal channelway which communicates with each of said vertical channelways and further including first and second bars and means for slidably extending and retracting said bars in each longitudinal channelway of said first and second walls, each of said bars including a plurality of notches and blanks, wherein said notches simultaneously align with each of said vertical channelways in a first position to expose each of said vertical channelways and said blanks align in a second position to obstruct each of said vertical channelways and such that ones of said plurality of holder means may be inserted and removed from said tray when said bars are in said first position and are secured to said tray in said second position.

10. Apparatus as set forth in claim 9 wherein said extension and retraction means includes:
    (a) a transverse beam extending between said first and second bars;
    (b) means for resiliently biasing said transverse beam relative to said tray; and
    (c) keyed lock means including a radially projecting tang for selectively restraining movement of said transverse beam.

11. Apparatus as set forth in claim 10 including a second transverse member coupled to said first and second bars forward of said transverse beam, whereby said first and second bars can simultaneously be operated to and fro as said second transverse member is retracted and extended relative to a tray wall.

12. Apparatus as set forth in claim 6 wherein each of said holder means includes an integral resilient latch which projects relative to the insertion of the displayed item into a framing portion having a holder display cavity such that in a first position said latch prevents the extraction of the displayed item from the display cavity and in a second deflected position permits the extraction of the displayed item.

13. Apparatus as set forth in claim 12 wherein said holder means includes means for biasing a displayed item within the display cavity into engagement with a display surface of the framing portion.

14. Apparatus as set forth in claim 13 wherein said biasing means comprises at least one integral resilient projection which extends from a second aperture containing display surface.

15. Apparatus as set forth in claim 1 wherein each of said plurality of holder means comprises:
    (a) a backing portion including first and second lateral pivot projections and having a display aperture therethrough;
    (b) a frame portion including a second display aperture therethrough;
    (c) means for supporting said frame portion to said backing portion with the display apertures in aligned relation and providing a display item access port adjacent said first and second pivot projections; and
    (d) latch means projecting from said backing portion for selectively deflecting into and out of obstructing alignment with said access port.

16. Apparatus as set forth in claim 15 including means resiliently projecting from said backing portion for biasing a display item into aligned engagement with said second display aperture.

17. Coin display and storage apparatus comprising:
    (a) a multi-walled tray;
    (b) a plurality of holder means for removably receiving and restraining a graded coin container thereto, each including a framing portion, for displaying at least one surface of the coin container and further including first and second pivot projections;
    (c) wherein first and second opposite walls of said tray include a plurality of vertically aligned channelways for receiving said pivot projections and supporting each holder means in pivotal relation to said tray and wherein each of said first and second walls includes a longitudinal channelway which communicates with each of said vertical channelways; and
    (d) first and second bars slidably mounted in the longitudinal channelways of said first and second walls, each of said bars including a plurality of notches and blanks, wherein said notches simultaneously align with each of said vertical channelways in a first position and said blanks obstruct each of said channelways in a second position to prevent the removal of each of said holder means in said second position.

18. Apparatus as set forth in claim 17 including:
    (a) a transverse beam secured between said first and second bars;
    (b) means for resiliently biasing said transverse beam relative to said base; and
    (c) keyed lock means including a radially projecting tang member for selectively restraining movement of said transverse beam.

* * * * *